(12) United States Patent
Franco et al.

(10) Patent No.: US 12,008,547 B2
(45) Date of Patent: Jun. 11, 2024

(54) APPARATUS FOR DIGITAL MANAGEMENT OF CRYPTOGRAPHIC ASSETS

(71) Applicant: OSOM Products, Inc., Cupertino, CA (US)

(72) Inventors: Nicholas Franco, San Jose, CA (US); Jason Sean Gagne-Keats, Cupertino, CA (US); Gary Anderson, San Mateo, CA (US)

(73) Assignee: OSOM PRODUCTS, INC., Cupertino, CA (US)

( * ) Notice: Subject to any disclaimer, the term of this patent is extended or adjusted under 35 U.S.C. 154(b) by 0 days.

(21) Appl. No.: 18/052,874

(22) Filed: Nov. 4, 2022

(65) Prior Publication Data
US 2024/0152905 A1 May 9, 2024

(51) Int. Cl.
*H04L 9/30* (2006.01)
*G06Q 20/36* (2012.01)
*H04L 9/00* (2022.01)

(52) U.S. Cl.
CPC ........... *G06Q 20/3672* (2013.01); *H04L 9/30* (2013.01); *H04L 9/50* (2022.05); *G06Q 2220/00* (2013.01)

(58) Field of Classification Search
CPC ...................................................... G06Q 20/36
USPC .......................................................... 705/66
See application file for complete search history.

(56) References Cited

U.S. PATENT DOCUMENTS

| | | | | |
|---|---|---|---|---|
| 2010/0192210 A1* | 7/2010 | Purdy, Sr. | ............. | H04L 9/3297 726/7 |
| 2021/0287322 A1* | 9/2021 | Yaffe | ..................... | G06T 1/0042 |
| 2022/0210061 A1* | 6/2022 | Simu | ..................... | H04L 9/3247 |
| 2022/0309491 A1* | 9/2022 | Shapiro | .................. | G06Q 30/08 |

FOREIGN PATENT DOCUMENTS

| | | | | |
|---|---|---|---|---|
| CN | 114553515 | * | 5/2022 | ............. H04L 63/12 |
| CN | 114553615 | * | 5/2022 | |
| KR | 20220138791 A1 | | 10/2022 | |

OTHER PUBLICATIONS

United States Patent & Trademark Office (USPTO), International Search Report and Written Opinion, PCT/US2022/079417, Feb. 28, 2023, counterpart to U.S. Appl. No. 18/052,874.

* cited by examiner

*Primary Examiner* — John W Hayes
*Assistant Examiner* — Cristina Owen Sherr
(74) *Attorney, Agent, or Firm* — Perkins Coie LLP; Alberto Araiza; Lena Petrovic

(57) ABSTRACT

This disclosure is directed to methods and systems for validating digital images (e.g., originality of digital images, source of digital images) by validating non-fungible tokens. The methods and systems enable a device to obtain analog values using an imaging sensor, such as on a camera of the device. A first identification code and digital image can be generated using the analog values and can be used to mint a first non-fungible token (NFT). When a request is made to validate a second NFT containing the same digital image, e.g., claiming to be the original digital image, the analog values can be used to generate another hash, and compared against the identification (ID) value of the second NFT.

20 Claims, 7 Drawing Sheets

APPARATUS FOR DIGITAL MANAGEMENT OF CRYPTOGRAPHIC ASSETS

TECHNICAL FIELD

The present disclosure is generally related to techniques for digital management of cryptographic assets.

BACKGROUND

Recent advances in communication technology can result in sensitive information (e.g., financial information, healthcare data, genetic data) being stored on devices or communicated between devices. In particular, communication technology has made proliferation of digital assets (e.g., digital images, digital photos, digital art) incredibly easy. As such, it may be difficult to prove and/or verify the source of certain resources. Originality of digital assets is important for many reasons including proper attribution to the original creator. For example, attribution of digital images can be especially difficult given that images may be reproductions of the original image (e.g., screenshotted, downloaded and reuploaded). Accordingly, a mechanism is desired that would enable individuals or entities to verify the source or originality (e.g., that a digital asset is not a reproduction) of a digital asset such as a digital image.

BRIEF DESCRIPTION OF THE DRAWINGS

Detailed descriptions of implementations of the present technology will be described and explained through the use of the accompanying drawings.

Figure 1:
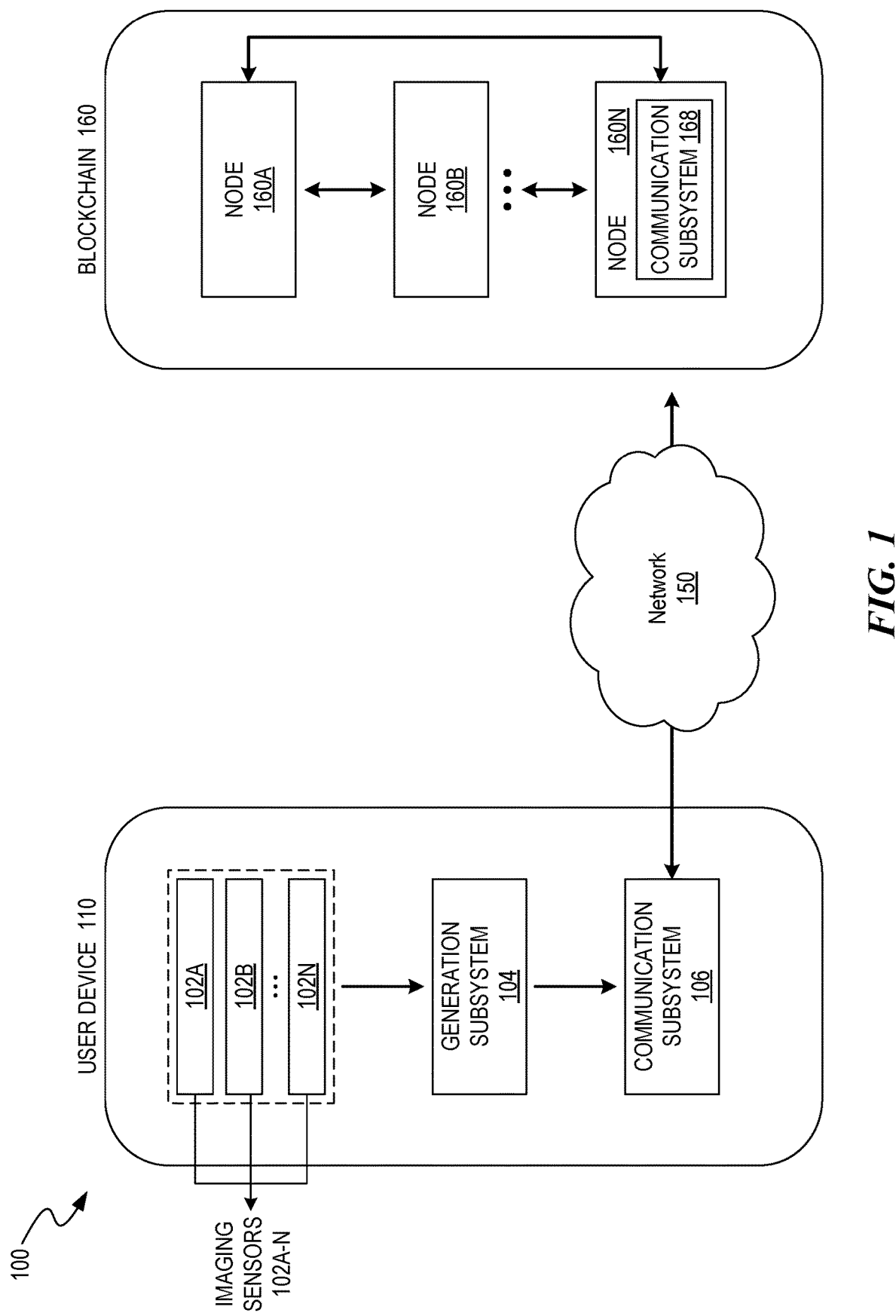
FIG. 1 is a block diagram illustrating an example system for validating a non-fungible token (NFT), e.g., to verify the originality and/or source of digital images, in accordance with one or more embodiments of this disclosure.

The techniques described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present disclosure. Accordingly, while specific implementations are shown in the drawings, techniques described herein are amenable to various modifications.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

One mechanism to enable both users and institutions to verify originality and/or the source of digital assets (e.g., digital images) can use blockchain technology and, in particular, cryptographic tokens (e.g., non-fungible tokens, also known as NFTs). Blockchains are generally public records distributed across multiple computing devices. Non-fungible tokens (NFTs), transferred via a blockchain, are inherently unique and may further include unique identifiers, data, and metadata. In many cases, ownership of, and transactions relating to these assets can be linked to the identity of those individuals who own and/or transfer (e.g., purchase, sell) them. The NFTs can represent an ownership of a digital asset (e.g., digital image) and can enable a user to verify originality and/or the source of digital images.

Therefore, methods and systems are described herein for validating a non-fungible token (NFT), e.g., to verify the originality and/or source of digital images. When a user takes an original image (e.g., creation of the image), such as on an electronic device (e.g., mobile phone, computer), one or more image sensors of the device can obtain one or more analog values. These analog values may be unique to the first instance of capturing the photo and unique to the device that captured the photo.

The analog values can be stored in a way so as to be accessed only by the user and/or device from which the analog values originate. For example, the analog values may be stored on the device, on a cryptography-based storage application such as a digital wallet associated with the device or stored at a remote server at a location identified by a resource identifier (e.g., a uniform resource identifier). Since the analog values are accessible only by the user, when a third-party requests to verify that a digital image originates from the device and/or user, the analog values can be used by the user for verification. The analog values can then be used to generate the digital photo as well as a hash value (e.g., generated by applying a hash function to the analog value(s)). The device can generate and transmit a blockchain operation request to be executed by a blockchain node for minting an NFT using the digital image and the hash value. The NFT can include the hash value as a hash identification code.

A third-party can then request to verify that a digital image originates from the device and/or user (e.g., is the original digital image), for example by transmitting a validation request referencing an NFT having a hash identification code associated with the NFT. The system can access the analog value(s) corresponding to the original digital image and generate a hash value using the analog value(s). Responsive to a determination that the hash value is equivalent to the hash identification code, the system can transmit a message indicating validity of the NFT.

The advantages and benefits of the methods, systems, and apparatuses disclosed herein include the reduction of security vulnerabilities with respect to both Internet-of-things (IoT) devices as well as network systems when compared to traditional methods. For example, by requiring additional authentication for verifying the source and/or originality of the digital images, the system can be able to prevent unwanted third-party users from using the image in unintended or undesired applications and/or attributing the digital image to other users. The disclosed methods improve fidelity of data transferred, authentication of users attempting to access the sensitive data, and/or the like. For example, the methods can be used to ascertain that data being transmitted and received is correct and not tampered with. In some embodiments, for example, the non-fungible token can only be verified by the original creator (e.g., device that captured the image and/or the user that captured the image) through an encryption and decryption protocol. Similarly, the methods can be used to ensure that sensitive information is only being shared with appropriate authorized users and shared by the correct party.

FIG. 1 is a block diagram illustrating an example system 100 for validating a non-fungible token (NFT), e.g., to verify the originality and/or source of digital images, in accordance with one or more embodiments of this disclosure. The system 100 includes a user device 110 in communication with one or more nodes of node 160A, node 160B . . . node 160N contributing to a blockchain system 160, e.g., via network 150. The user device 110 is sometimes referred to as an "electronic device." An example blockchain system 300 is illustrated and described in more detail with reference to FIG. 3. The system 100 is implemented using the components of the example computer system 600 illustrated and described in more detail with reference to FIG. 6. For example, one or more of user device 110, node 160A, node 160B . . . node 160N can include computer system 600. In embodiments, user device 110 or blockchain system 160 can implement machine learning (ML) system 500 illustrated and described in more detail with reference to FIG. 5. Likewise, embodiments of the system 100 can include different and/or additional components or can be connected in different ways.

User device 110 can include software, hardware, or a combination of the two. User device 110 can be associated with a cryptography-based storage application, e.g., digital wallet, that can also include software, hardware, and/or a combination of software and hardware. For example, a cryptography-based storage application can include software executed on one or multiple devices or can include hardware such as a physical device. In some cases, the cryptography-based storage application can be software and can be stored in the user device (e.g., client device such as smartphone, laptop, electronic tablet), and a user of the cryptography-based storage application can access the cryptography-based storage application on the user device.

Alternatively, or additionally, the cryptography-based storage application can reside on a special device, such as a fob, intended for storing the cryptography-based storage application. For example, the device can store private keys in a memory of the device and allow transactions to be signed (e.g., via generating a cryptographic signature) on the device itself. Examples of cryptography-based storage applications can include cryptographic wallets. For example, a cryptography-based storage application refer to a digital wallet, including one or more of a hot wallet, cold wallet, and/or the like. As described herein, some examples of hardware cryptographic wallets include Ledger®, and Trezor®. Software cryptographic wallets can include Metamask® and others.

When a user first takes an original image (e.g., creation of the image) using user device 110 (e.g., mobile phone, computer), one or more image sensors of image sensor 102A . . . image sensor 102N of the device can obtain analog value(s). The analog value(s) can be unique to the first instance of capturing the photo and unique to the device that captured the photo.

The analog values can be stored in a way so as to be accessed only by the user and/or device from which the analog values originate. For example, the analog values can be stored on the user device 110, e.g., in memory. Alternatively, the analog values can be stored on a cryptography-based storage application such as a digital wallet, associated with user device 110 or stored at a remote server at a location identified by a resource identifier (e.g., a uniform resource identifier (URI)). In some embodiments, the resource identifier can be a URI. The resource identifier can include a link or another pointer, for example, to a location of a remote computing device, and/or the like. In some examples, the resource identifier can include a reference to a location on a third-party platform (e.g., website, application) allowing access to the analog values directly, or an encrypted payload storing the analog values (e.g., encrypted with a public key of the second user). Since the analog values are accessible only by the user, when a third-party requests to verify that a digital image originates from the device and/or user, the analog values can be used by the user for verification.

The imaging sensors 102A-N can pass at least a portion of the data included in the analog value(s), or a pointer to the data in memory, to other subsystems such as generation subsystem 104 and/or communication subsystem 106. Generation subsystem 104 can include software components, hardware components, or a combination of both. For example, generation subsystem 104 can include software components (e.g., API calls) that access and/or execute programs such as on-chain programs to generate tokens (e.g., cryptographic tokens). Generation subsystem 104 can access data such as the analog values from the imaging sensors 102A-N.

Generation subsystem 104 can be used to generate, using the one or more analog values or at least a portion of the data included in the analog value(s), a hash value and a digital image. An example hash function is illustrated and described in more detail with reference to FIG. 4A. For example, generation subsystem 104 can apply one or more hash functions (e.g., any function that can be used to map data of arbitrary size to fixed-size values) to the one or more analog values to obtain the hash value. For example, any of Message Digest version 5 (MD5), Secure Hash Algorithm version 2 (SHA-1), Secure Hash Algorithm suite (SHA-2) (e.g., comprising SHA-224, SHA-256, SHA-384, and SHA-512), NT LAN Manager algorithm (NTLM), Microsoft LAN Manager (LANMAN), and/or the like can be used. In order to generate the digital image from the analog value(s), the generation subsystem 104 can perform interpolation, sampling and quantization.

Generation subsystem 104 can subsequently generate a blockchain operation request to be executed by a blockchain node for minting an NFT using the digital image and the first hash value. According to some examples, the NFT can include a reference (e.g., URI, link) to the digital image and the hash value as part of the metadata of the NFT. The NFT can be assigned to the cryptography-based storage application associated with the user and/or user device. In some examples, the NFT can include the hash value as a hash identification code. The generation subsystem 104 can pass at least a portion of the generated blockchain operation request, or a pointer to the data in memory, to other subsystems such as communication subsystem 106. As referenced herein, a non-fungible token (NFT) is a record on a blockchain that is associated with a particular digital or physical asset. The ownership of an NFT is recorded in a blockchain, and can be transferred by the owner, allowing NFTs to be sold and traded. NFTs typically contain references to digital files such as photos, videos, or audio. Because NFTs are uniquely identifiable assets, they differ from cryptocurrencies, which are fungible.

The communication subsystem 106 can transmit the blockchain operation request to a blockchain node (e.g., any of blockchain nodes 160A-N) to commit the first NFT to a blockchain (e.g., as described in detail with reference to FIG. 3) using an on-chain program, e.g., via the network 150. Network 150 can be a local area network, a wide area network (e.g., the Internet), or a combination of the two. Communication subsystem 106 can include software components, hardware components, or a combination of both. For example, communication subsystem 106 can include a network card (e.g., a wireless network card and/or a wired network card) that is associated with software to drive the card. As referred to herein, an on-chain program can include any suitable code (e.g., a computer program) for performing computing operations stored on a blockchain. An on-chain program can reference a program stored on a blockchain and can be used to automate execution of a transaction (e.g., blockchain operation). In some examples, an on-chain program can refer to a smart contract, e.g., deployed on a blockchain. In some cases, the on-chain program can run when predetermined conditions are satisfied.

In some examples, when the blockchain node (e.g., any of blockchain nodes 160A-N) successfully completes the blockchain operation, e.g., mints the NFT, the blockchain node can transmit an indication that the blockchain operation is completed (e.g., was successful). For example, the blockchain node can communicate with the user device via communication subsystem 106 to indicate that the blockchain operation was successful. Each of the blockchain nodes can also be associated with another cryptography-based storage application.

In some embodiments, once the NFT is minted, the communication subsystem 106 can receive one or more requests (e.g., from a computing/computer device) to validate a non-fungible token (NFT), e.g., to verify the originality and/or source of a digital image associated with the NFT. For example, a third-party can request to verify that a digital image originates from the device and/or user (e.g., is the original digital image), for example by transmitting a validation request referencing an NFT. The referenced NFT can also include a resource identifier (e.g., URI) or link that identifies a location (e.g., of a remote server) storing one or more analog values. In some examples, the referenced NFT can include an encrypted payload storing the resource identifier and/or link encrypted using a public key of the cryptography-based storage application associated with the user device (e.g., the user device that was used to create the image associated with the referenced NFT). The referenced NFT can also include an identifier.

In response to receiving the validation request, the user device 110 can retrieve the one or more analog values using the cryptography-based storage application. For example, the user device can obtain metadata of the NFT, which can include the encrypted payload storing the resource identifier. Using the private key of the cryptography-based storage application, the user device 110 can decrypt the encrypted payload to obtain the resource identifier and obtain the analog values using the resource identifier. The user device 110 can generate a hash value using the one or more analog values (e.g., by applying any of the hashing functions described herein) and determine whether or not the generated hash value matches the hash identification code of the referenced NFT. Responsive to determining that the second hash value matches the second hash identification code, the user device 110 can transmit a message indicating validity of the referenced NFT to the requesting device (e.g., via communication subsystem 106). Alternatively or additionally, the user device 110 can transmit the generated hash value to the requesting device via communication subsystem 106 and determine whether the generated hash value matches the hash identification code.

As described herein, the system can encrypt the resource identifier (e.g., URI) identifying a location (e.g., on a remote server) of the analog value(s) using a public key associated with the cryptography-based storage application of the user. For example, a function (e.g., RSA function) can be applied to a message (or the hash of a message), such as the resource identifier, with the public key of the first cryptography-based storage application belonging to the first user. The transfer system 102 can request that the first device decrypt the encrypted payload (e.g., using the private key of the first cryptography-based storage application) and transfer the data stored in the resource identifier to requesting parties (e.g., other devices of other users). Any suitable functions and/or alternative digital signature schemes can be used, such as PSS and/or the like.

The system can also generate a second blockchain operation request (e.g., using generation subsystem 104) for inserting the encrypted URI into metadata of the first NFT. In this way, the system can prevent any user device except the user device that generated the original digital image to access the analog values and validate the NFT. In response to a request to validate the NFT, e.g., verify the digital image associated with the NFT is an original image, a user device can decrypt the encrypted URI obtained from metadata of the first NFT using a private key associated with the cryptography-based storage application to obtain a URI indicating the location of the analog values and provide, using the URI, the one or more analog values. The user device can subsequently use the analog value(s) to generate the hash and compare the hash to the metadata of the NFT.

As described herein, the ownership of an NFT is recorded in a blockchain, and can be transferred by the owner, allowing NFTs to be sold and traded. For example, the system can receive, from a second cryptography-based storage application of a second user and/or from the cryptography-based storage application of a first user, a transfer request for transferring control of the first NFT from a cryptography-based storage application of the first user to a cryptography-based storage application of a second user. In some embodiments, while control of the NFT is transferred to the cryptography-based storage application of the second user, the encrypted payload can be accessible using the first (e.g., original) user's cryptography-based storage application. For example, the encrypted payload can remain encrypted using the public key of the cryptography-based storage application of the first user. When the blockchain operation request is completed, e.g., ownership of the NET is transferred to the second user, the system may receive an indication that the request was completed. For example, a blockchain node may execute the blockchain operation and transmit to the user device an indication that the blockchain operation was successfully completed. In response to receiving the indication, the user device may transmit a notification to a computer device associated with the second cryptography-based storage application.

Alternatively, the original user can also transfer the ability to access the analog values as well. For example, the user (original) device can decrypt the encrypted payload using the private key of the first cryptography-based storage application to obtain the resource identifier. The system (e.g., user device 110, any of nodes 160A-N) can subsequently encrypt the resource identifier using a public key associated with the cryptography-based storage application to which control is being transferred to in order to obtain a second encrypted payload (e.g., second encrypted URI). Then the system can transmit a second blockchain operation request for updating the metadata of the first NFT with the second encrypted payload for transferring control of the first NFT to the second user.

Figure 2:
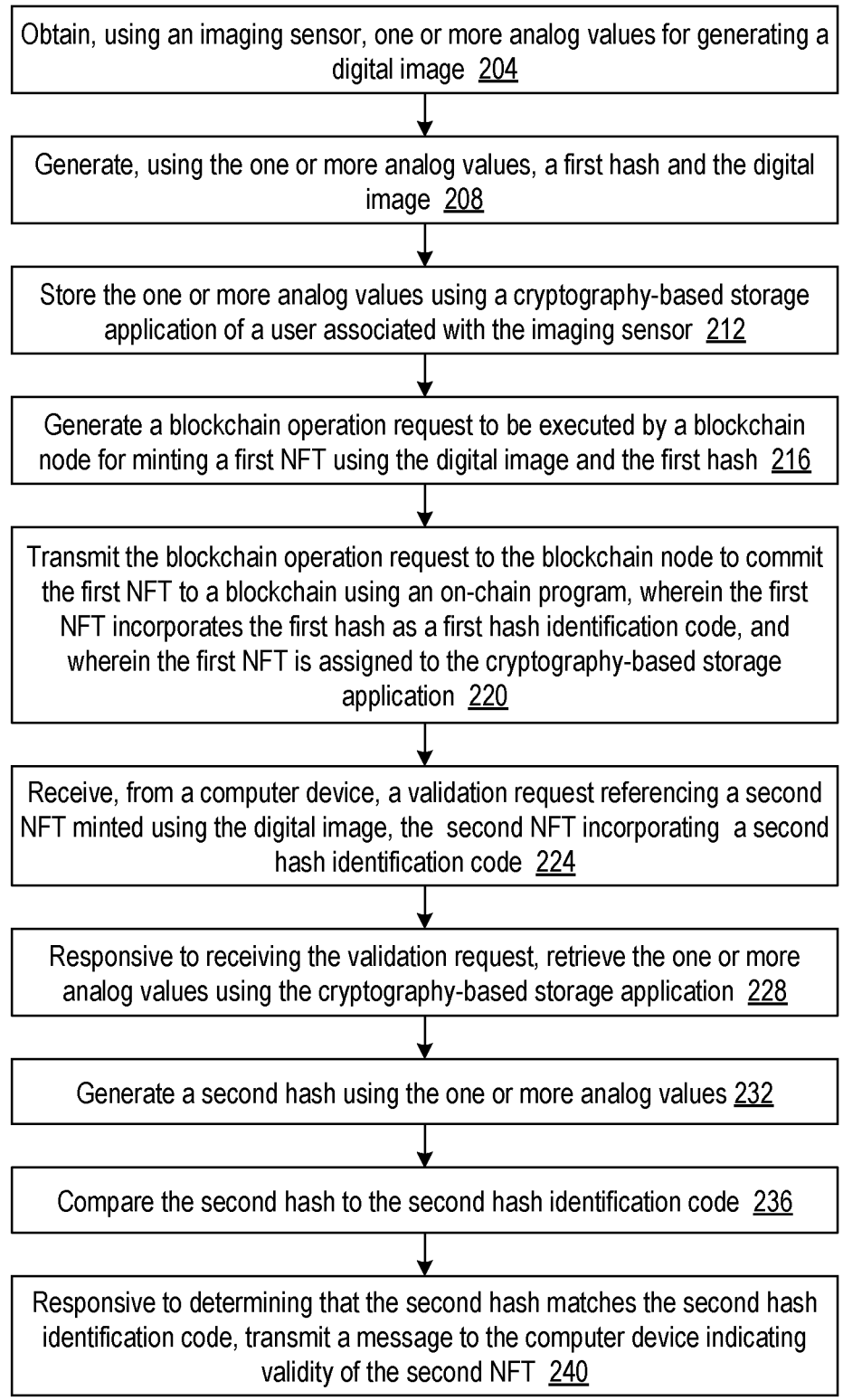
FIG. 2 is a flow diagram illustrating an example process for validating a non-fungible token (NFT), e.g., to verify the originality and/or source of digital images, in accordance with one or more embodiments of this disclosure.

FIG. 2 is a flow diagram illustrating an example process for validating a non-fungible token (NFT), e.g., to verify the originality and/or source of digital images, in accordance with one or more embodiments of this disclosure. In some embodiments, the process of FIG. 2 is performed by the user device 110 illustrated and described in more detail with reference to FIG. 1. In other embodiments, the process is performed by a computer system, e.g., the example computer system 600 illustrated and described in more detail with reference to FIG. 6. Likewise, embodiments can include different and/or additional steps or can perform the steps in different orders.

In step 204, the user device 110 obtains one or more analog values using one or imaging sensors. The imaging sensors are the same as or similar to the imaging sensors 102A-N illustrated and described in more detail with reference to FIG. 1. The analog values are for generating a digital image. The digital image is used to mint an NFT.

In step 208, the user device 110 generates, using the one or more analog values, a first hash and the digital image. An example hash function is illustrated and described in more detail with reference to FIG. 4A. As described herein, generation subsystem of user device 110 can use various methods known in the art to generate the digital image from the analog values (e.g., quantization, interpolation). The device can generate the hash by applying a hash function to the one or more analog values, for example, any of Message Digest version 5 (MD5), Secure Hash Algorithm version 2 (SHA-1), Secure Hash Algorithm suite (SHA-2) (e.g., comprising SHA-224, SHA-256, SHA-384, and SHA-512), NT LAN Manager algorithm (NTLM), Microsoft LAN Manager (LANMAN), and/or the like can be used.

In step 212, the user device 110 stores the one or more analog values using a cryptography-based storage application of a user associated with the imaging sensor. The cryptography-based storage application, as described herein, can be a digital wallet. In some examples, the cryptography-based storage application can include a software and/or hardware wallet configured to store the NFT. For example, the device can store the one or more analog values on the cryptography-based storage application. In particular, the user device 110 can send, using the cryptography-based storage application (e.g., associated with the user device), a digital representation of the one or more analog values to a cryptographic wallet.

Alternatively or additionally, the analog value(s) can be stored at a remote computing device (e.g., a database system). For example, the remote computing device can store the data at the remote computing device (e.g., server) and generate a link identifying a location to access the data at the remote computing device. In some examples, the data stored at the location identified by the link at the remote server can be encrypted itself (e.g., using a public key) and only available for access by authenticated parties (e.g., the owner of the cryptography-based storage application associated with the device that created the original digital image). The remote computing device can provide the link to the user device and/or blockchain nodes. An example blockchain system 300 is illustrated and described in more detail with reference to FIG. 3. Furthermore, the transfer system can generate a blockchain operation request (e.g., to be executed by a blockchain node) for generating a non-fungible token storing the link as a uniform resource identifier (URI). Alternatively or additionally, the URI can be encrypted (e.g., using a public key associated with the cryptography-based storage application). For example, storing the one or more analog values can include encrypting the uniform resource identifier (URI) using a public key associated with the cryptography-based storage application and generating a second blockchain operation request for inserting the encrypted URI into metadata of the NFT.

In step 216, the user device 110 generates a blockchain operation request to be executed by a blockchain node for minting a first NFT using the digital image and the first hash. In step 220, the device can transmit the blockchain operation request to the blockchain node to commit the first NFT to a blockchain using an on-chain program, wherein the first NFT incorporates the first hash as a first hash identification code, and wherein the first NFT is assigned to the cryptography-based storage application. As described herein, any of blockchain nodes 160A-N can execute the blockchain operation. The NFT can include the resource identifier, or an encrypted payload storing the resource identifier.

In step 224, the user device 110 receives, from a computer device, a validation request referencing a second NFT minted using the digital image, the second NFT incorporating a second hash identification code. In step 228, responsive to receiving the validation request, the device can retrieve the one or more analog values using the cryptography-based storage application. The validation request can reference an NFT including a link to a digital image for which the requesting party is requesting to verify originality and/or the source of. The referenced NFT can also include a resource identifier (e.g., URI) that identifies a location (e.g., of a remote server) storing one or more analog values. Alternatively, the NFT can include a device identifier of the device used to create the digital image and/or an address of the cryptography-based storage application of the device used to create the digital image, such that the system can query the cryptography-based storage application and/or original device to verify the originality of the image. In some examples, the address data can be a string of alphanumeric characters. For example, the address can be a string of 32 alphanumeric characters and can identify what is sometimes referred to as a cryptographic wallet (e.g., a digital wallet).

In the example where the URI is encrypted using a public key, e.g., associated with a cryptography-based storage application associated with the owner/device that captured the digital image, retrieving the one or more analog values can include decrypting the encrypted URI obtained from metadata of the NFT. For example, a device (e.g., the device used to generate/create/capture the digital image) can use a private key associated with the cryptography-based storage application to obtain the URI. Further, retrieving the one or more analog values can include providing, using the URI, the one or more analog values. For example, the device can transmit a request or use the URI to access the analog values at the location indicated by the URI at the remote server. The device can obtain, e.g., via a transmission from the remote server, the one or more analog values.

In step 232, the user device 110 generates a second hash using the one or more analog values. The device can generate the hash by applying a hash function to the one or more analog values, for example, any of Message Digest version 5 (MD5), Secure Hash Algorithm version 2 (SHA-1), Secure Hash Algorithm suite (SHA-2) (e.g., comprising SHA-224, SHA-256, SHA-384, and SHA-512), NT LAN Manager algorithm (NTLM), Microsoft LAN Manager (LANMAN), and/or the like can be used. In some examples, the device generates a second hash using the same input and hash function as when generating the first hash, such that the second hash and first hash are equivalent.

In step 236, the user device 110 compares the second hash to the second hash identification code. For example, the device can compare to see if the hash is different from the hash identification code, and/or whether at least a portion of the hash is equivalent to at least a portion of the hash identification code. In step 240, responsive to determining that the second hash matches the second hash identification code, the device transmits a message to the computer device indicating validity of the second NFT, for example, via communication subsystem through network 150.

Figure 3:
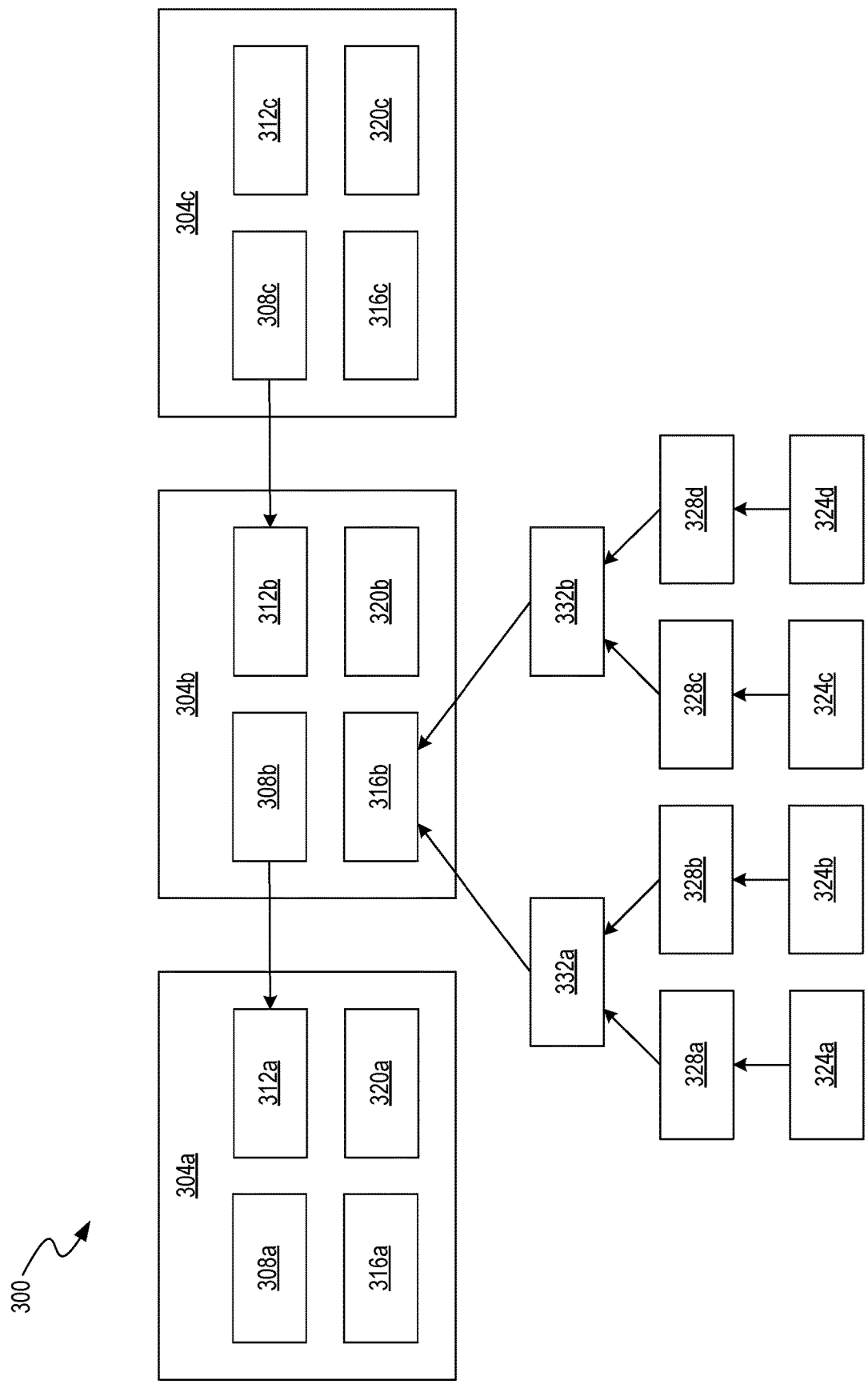
FIG. 3 is a block diagram illustrating components of at least a portion of an exemplary blockchain, in accordance with one or more embodiments of this disclosure.

FIG. 3 is a block diagram illustrating components of at least a portion of an example blockchain system 300, in accordance with one or more embodiments of this disclosure. Blockchain system 300 includes blockchain 304. In embodiments, the blockchain 304 is a distributed ledger of transactions (e.g., a continuously growing list of records, such as records of transactions for digital assets such as cryptocurrency, bitcoin, or electronic cash) that is maintained by a blockchain system 300. For example, the blockchain 304 is stored redundantly at multiple nodes (e.g., computers) of a blockchain network. Each node in the blockchain network can store a complete replica of the entirety of blockchain 304. In some embodiments, the blockchain system 300 implements storage of an identical blockchain at each node, even when nodes receive transactions in different orderings. The blockchain 304 shown by FIG. 3 includes blocks such as block 304a, block 304b, and/or block 304c. Likewise, embodiments of the blockchain system 300 can include different and/or additional components or be connected in different ways.

The terms "blockchain" and "chain" are used interchangeably herein. In embodiments, the blockchain 304 is a distributed database that is shared among the nodes of a computer network. As a database, the blockchain 304 stores information electronically in a digital format. The blockchain 304 can maintain a secure and decentralized record of transactions (e.g., transactions such as transaction 324a and/or transaction 324b). For example, the ERC-721 or ERC-1155 standards are used for maintaining a secure and decentralized record of transactions. The blockchain 304 provides fidelity and security for the data record. In embodiments, blockchain 304 collects information together in groups, known as "blocks" (e.g., blocks such as block 304a, block 304b, and/or block 304c) that hold sets of information.

The blockchain 304 structures its data into chunks (blocks) (e.g., blocks such as block 304a, block 304b, and/or block 304c) that are strung together. Blocks (e.g., block 304c) have certain storage capacities and, when filled, are closed and linked to a previously filled block (e.g., block 304b), forming a chain of data known as the "blockchain." New information that follows a freshly added block (e.g., block 304b) is compiled into a newly formed block (e.g., block 304c) that will then also be added to the blockchain 304 once filled. The data structure inherently makes an irreversible timeline of data when implemented in a decentralized nature. When a block is filled, it becomes a part of this timeline of blocks. Each block (e.g., block 304a) in the blockchain system 300 is given an exact timestamp (e.g., timestamp 312a) when it is added to the blockchain system 300. In the example of FIG. 3, blockchain system 300 includes multiple blocks. Each of the blocks (e.g., block 304a, block 304b, block 304c) can represent one or multiple transactions and can include a cryptographic hash of the previous block (e.g., previous hashes 308a-c), a timestamp (e.g., timestamps 312a-c), a transactions root hash (e.g., 316a-c), and a nonce (e.g., 320a-c). A transactions root hash (e.g., transactions root hash 316b) indicates the proof that the block 304b contains all the transactions in the proper order. Transactions root hash 316b proves the integrity of transactions in the block 304b without presenting all transactions.

In embodiments, the timestamp 312a-c of each of corresponding blocks of block 304a, block 304b, block 304c includes data indicating a time associated with the block. In some examples, the timestamp includes a sequence of characters that uniquely identifies a given point in time. In one example, the timestamp of a block includes the previous timestamp in its hash and enables the sequence of block generation to be verified.

In embodiments, nonces 320a-c of each of corresponding blocks of block 304a, block 304b, block 304c include any generated random or semi-random number. The nonce can be used by miners during proof of work (PoW), which refers to a form of adding new blocks of transactions to blockchain 304. The work refers to generating a hash that matches the target hash for the current block. For example, a nonce is an arbitrary number that miners (e.g., devices that validate blocks) can change in order to modify a header hash and produce a hash that is less than or equal to the target hash value set by the network.

As described above, each of blocks of block 304a, block 304b, block 304c of blockchain 304 can include respective block hash, e.g., transactions root hash 316a, transactions root hash 316b, and transactions root hash 316c. Each of block hashes 316a-c can represent a hash of a root node of a Merkle tree for the contents of the block (e.g., the transactions of the corresponding block). For example, the Merkle tree contains leaf nodes corresponding to hashes of components of the transaction, such as a reference that identifies an output of a prior transaction that is input to the transaction, an attachment, and a command. Each non-leaf node can contain a hash of the hashes of its child nodes. The Merkle tree can also be considered to have each component as the leaf node with its parent node corresponding to the hash of the component.

In the example of FIG. 3, block 304b records transactions 324a-d. Each of the leaf nodes 328a-d contain a hash corresponding to transactions 324a-d respectively. As described above, a hash (e.g., the hash in leaf node such as node 328a) can be a hash of components of a transaction (e.g., transaction 324a), for example, a reference that identifies an output of a prior transaction that is input to the transaction 324a, an attachment, and a command. Each of the non-leaf nodes of node 332a and node 332b can contain a hash of the hashes of its child nodes (e.g., leaf nodes such as node 328a and node 328b). In this example, node 332a can contain a hash of the hashes contained in node 328a, node 328b and node 332b can contain a hash of the hashes contained in node 328c, node 328d. The root node, which includes (e.g., contains) transactions root hash 316b, can contain a hash of the hashes of child nodes 332a-b.

A Merkle tree representation of a transaction (e.g., transaction 324a) allows an entity needing access to the transaction 324a to be provided with only a portion that includes the components that the entity needs. For example, if an entity needs only the transaction summary, the entity can be provided with the nodes (and each node's sibling nodes) along the path from the root node to the node of the hash of the transaction summary. The entity can confirm that the transaction summary is that used in the transaction 324a by generating a hash of the transaction summary and calculating the hashes of the nodes along the path to the root node. If the calculated hash of the root node matches the hash of node 328a of the transaction 324a, the transaction summary is confirmed as the one used in the transaction. Because only the portion of the Merkle tree relating to components that an entity needs is provided, the entity will not have access to other components. Thus, the confidentiality of the other components is not compromised.

In some examples, the blockchain system 300 is a bitcoin system developed to allow digital assets such as electronic cash to be transferred directly from one party to another without going through a central authority, such as financial institution (e.g., as described in the white paper entitled "Bitcoin: A Peer-to-Peer Electronic Cash System" by Satoshi Nakamoto, hereby incorporated by reference in its entirety). A bitcoin (an electronic coin) can be represented by a chain of transactions that transfers ownership from one party to another party.

To transfer ownership of a digital asset, such as a bitcoin, using the blockchain system 300, a new transaction, such as one of transactions 324a-d, is generated and added to a stack of transactions in a block, e.g., block 304b. To record a transaction in a blockchain, each party and asset involved with the transaction needs an account that is identified by a digital token. For example, when a first user wants to transfer an asset that the first user owns to a second user, the first and second user both create accounts, and the first user also creates an account that is uniquely identified by the asset's identification number. The account for the asset identifies the first user as being the current owner of the asset. The first user (i.e., the current owner) creates a transaction (e.g., transaction 324a) against the account for the asset that indicates that the transaction 324a is a transfer of ownership and outputs a token identifying the second user as the next owner and a token identifying the asset. The transaction 324a is signed by the private key of the first user (i.e., the current owner), and the transaction 324a is evidence that the second user is now the new current owner and that ownership has been transferred from the first to the second user.

The transaction 324a (e.g., a new transaction), which includes the public key of the new owner (e.g., a second user to whom a digital asset is assigned ownership in the transaction), is digitally signed by the first user with the first user's private key to transfer ownership to the second user (e.g., new owner), as represented by the second user public key. The signing by the owner of the bitcoin is an authorization by the owner to transfer ownership of the bitcoin to the new owner via the transaction 324a (e.g., the new transaction). Once the block is full, the block is "capped" with a block header, that is, a hash digest of all the transaction identifiers within the block. The block header is recorded as the first transaction in the next block in the chain, creating a mathematical hierarchy called the "blockchain." To verify the current owner, the blockchain 304 of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

Additionally, in some embodiments, the blockchain system 300 uses one or more smart contracts to enable more complex transactions. A smart contract includes computer code implementing transactions of a contract. The computer code can be executed on a secure platform (e.g., an Ethereum platform, which provides a virtual machine) that supports recording transactions (e.g., 324a-d) in blockchains. For example, a smart contract can be a self-executing contract with the terms of the agreement between buyer and seller being directly written into lines of code. The code and the agreements contained therein exist across a distributed, decentralized blockchain network.

In addition, the smart contract can itself be recorded as a transaction 324a in the blockchain 304 using a token that is a hash of node 328a of the computer code so that the computer code that is executed can be authenticated. When deployed, a constructor of the smart contract executes, initializing the smart contract and its state. The state of a smart contract is stored persistently in the blockchain 304. When a transaction 324a is recorded against a smart contract, a message is sent to the smart contract, and the computer code of the smart contract executes to implement the transaction (e.g., debit a certain amount from the balance of an account). The computer code ensures that all the terms of the contract are complied with before the transaction 324a is recorded in the blockchain 304.

For example, a smart contract can support the sale of an asset. The inputs to a smart contract to sell an asset can be tokens identifying the seller, the buyer, the asset, and the sale price in U.S. dollars or cryptocurrency. The computer code is used to ensure that the seller is the current owner of the asset and that the buyer has sufficient funds in their account. The computer code records a transaction (e.g., transaction 324a) that transfers the ownership of the asset to the buyer and a transaction (e.g., transaction 324b) that transfers the sale price from the buyer's account to the seller's account. If the seller's account is in U.S. dollars and the buyer's account is in Canadian dollars, the computer code can retrieve a currency exchange rate, determine how many Canadian dollars the seller's account should be debited, and record the exchange rate. If either of transaction 324a or transaction 324b is not successful, neither transaction is recorded.

When a message is sent to a smart contract to record a transaction 324a, the message is sent to each node that maintains a replica of the blockchain 304. Each node executes the computer code of the smart contract to implement the transaction 324a. For example, if a hundred nodes each maintain a replica of the blockchain 304, the computer code executes at each of the hundred nodes. When a node completes execution of the computer code, the result of the transaction 324a is recorded in the blockchain 304. The nodes employ a consensus algorithm to decide which transactions (e.g., transaction 324c) to keep and which transactions (e.g., transaction 324d) to discard. Although the execution of the computer code at each node helps ensure the authenticity of the blockchain 304, large amounts of computer resources are required to support such redundant execution of computer code.

Although blockchains can effectively store transactions 324a-d, the large amount of computer resources, such as storage and computational power, needed to maintain all the replicas of the blockchain can be problematic. To overcome this problem, some systems for storing transactions 324a-d do not use blockchains, but rather have each party to a transaction maintain its own copy of the transaction 324a. One such system is the Corda™ system developed by R3™ that provides a decentralized distributed ledger platform in which each participant in the platform has a node (e.g., computer system) that maintains its portion of the distributed ledger.

When parties agree on the terms of a transaction 324a, a party submits the transaction 324a to a notary, which is a trusted node, for notarization. The notary maintains a consumed output database of transaction outputs that have been input into other transactions. When a transaction 324a is received, the notary checks the inputs to the transaction 324a against the consumed output database to ensure that the outputs that the inputs reference have not been spent. If the inputs have not been spent, the notary updates the consumed output database to indicate that the referenced outputs have been spent, notarizes the transaction 324a (e.g., by signing the transaction or a transaction identifier with a private key of the notary), and sends the notarized transaction to the party that submitted the transaction 324a for notarization. When the party receives the notarized transaction, the party stores the notarized transaction and provides the notarized transaction to the counterparties.

In embodiments, a notary is a non-validating notary or a validating notary. When a non-validating notary is to notarize a transaction (e.g., transaction 324b), the non-validating notary determines that the prior output of a prior transaction (e.g., transaction 324a), that is, the input of a current transaction, e.g., transaction 324b, has not been consumed. If the prior output has not been consumed, the non-validating notary notarizes the transaction 324b by signing a hash of node 328b of the transaction. To notarize a transaction 324b, a non-validating notary needs only the identification of the prior output (e.g., the hash of node 328a of the prior transaction (e.g., transaction 324a) and the index of the output) and the portion of the Merkle tree needed to calculate the hash of node 328b of the transaction 324b.

As described herein, in some embodiments, the blockchain system 300 uses one or more smart contracts to enable more complex transactions. For example, a validating notary validates a transaction (e.g., transaction 324d), which includes verifying that prior transactions 324a-c in a backchain of transactions are valid. The backchain refers to the collection of prior transactions (e.g., transaction 324c) of a transaction 324d, as well as prior transactions of transaction 324a, transaction 324b, and transaction 324c, and so on. To validate a transaction 324d, a validating notary invokes validation code of the transaction 324d. In one example, a validating notary invokes validation code of a smart contract of the transaction 324d. The validation code performs whatever checks are needed to comply with the terms applicable to the transaction 324d. This checking can include retrieving the public key of the owner from the prior transaction (e.g., transaction 324c) (pointed to by the input state of the transaction 324d) and checks the signature of the transaction 324d, ensuring that the prior output of a prior transaction that is input has not been consumed, and checking the validity of each transaction (e.g., transaction 324c) in the backchain of the transactions. If the validation code indicates that the transaction 324d is valid, the validating notary notarizes the transaction 324d and records the output of the prior transaction (e.g., transaction 324c) as consumed.

In some examples, to verify that the transactions 324a-d in a ledger stored at a node are correct, the blocks, e.g., block 304a, block 304b, block 304c in the blockchain 304 can be accessed from oldest block (e.g., block 304a) to newest block (e.g., block 304c), generating a new hash of the block 304c and comparing the new hash to the hash 308c generated when the block 304c was created. If the hashes are the same, then the transactions in the block are verified. In one example, the Bitcoin system also implements techniques to ensure that it would be infeasible to change a transaction 324a and regenerate the blockchain 304 by employing a computationally expensive technique to generate a nonce 320b that is added to the block when it is created. A bitcoin ledger is sometimes referred to as an Unspent Transaction Output ("UTXO") set because it tracks the output of all transactions that have not yet been spent.

Figure 4A:
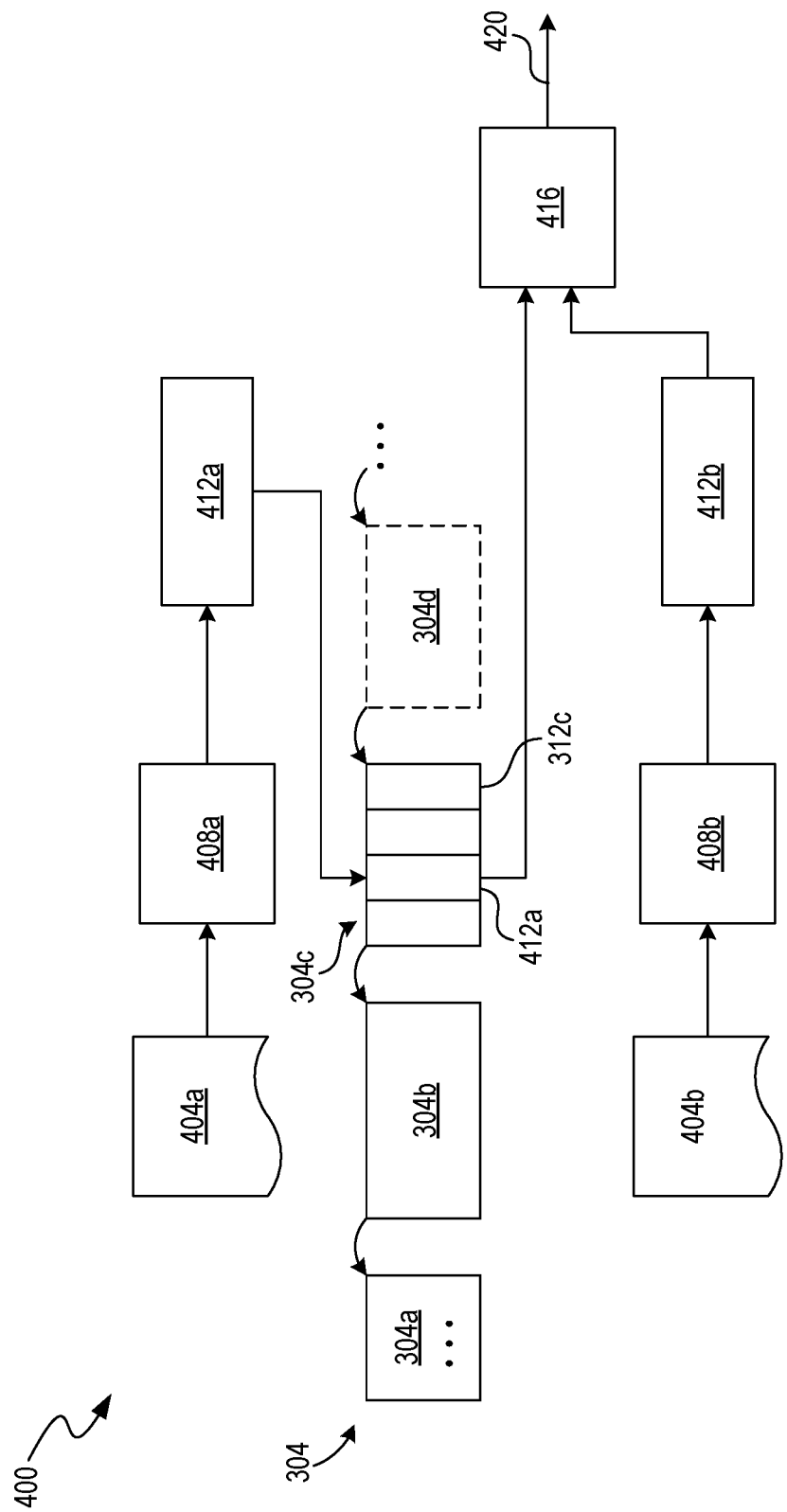
FIG. 4A is a drawing illustrating an integrity verification scheme performed in part by applying hash functions, in accordance with one or more embodiments of this disclosure.

FIG. 4A is a drawing illustrating an example hash algorithm. The process 400 shown by FIG. 4A uses a hash algorithm to generate a non-fungible token (NFT) or perform a cryptographic transaction on a blockchain. An example blockchain 304, e.g., as shown in FIG. 4A, is also illustrated and described in detail with reference to FIG. 3. The process 400 can be performed by a computer system such as that described with reference to FIG. 6 and/or by nodes of the blockchain 304. Some embodiments include different and/or additional steps or perform steps in different orders.

In embodiments, a digital message, electronic art, a digital collectible, any other form of digital content, or a combination thereof digital content 404a can be hashed using hashing algorithm 408a. The hashing algorithm 408a (sometimes referred to as a "hash function") can be a function used to map data of arbitrary size (e.g., digital content 404a) to fixed-size values (e.g., hash of values 412a). The values 412a that are returned by the hashing algorithm 408a can be called hash values, hash codes, digests, or hashes. The values 412a can be used to index a fixed-size table called a hash table. A hash table, also known as a hash map, is a data structure that implements an associative array or dictionary, which is an abstract data type that maps keys (e.g., digital content 404a) to values 412a.

The output of the hashed digital content (e.g., hash of values 412a) can be inserted into a block (e.g., block 304c) of the blockchain 304 (e.g., comprising blocks such as blocks such as block 304a, block 304b, block 304c-). The block 304c can include, among other things, information such as timestamp 312c. In order to verify that the block 304c is correct, a new hash 412b is generated by applying hashing algorithm 408b to the digital content 404b. The new hash 412b is compared to the hash of values 412a in the blockchain 304 at comparison step 416. If the new hash 412b is the same as the hash of values 412a of the block 304c, the comparison yields an indication that they match. For example, the decision 420 can indicate that the hashes of values 412a-b are the same or not. The hashes can be indicated to be the same if the characters of the hash match. The hashing algorithms 408a-b can include any suitable hashing algorithm. Examples include Message Digest 5 (MD5), Secure Hashing Algorithm (SHA) and/or the likes.

Components of the process 400 can generate or validate an NFT, which is a cryptographic asset that has a unique identification code and metadata that uniquely identifies the NFT. In one example, the digital content 404a can be hashed and minted to generate an NFT, or the digital content 404a can represent an NFT that is verified using the process 400 and the digital content 404b. An NFT can include digital data stored in the blockchain 304. The ownership of an NFT is recorded in the blockchain 304 and transferrable by an owner, allowing the NFT to be sold and traded. The NFT contains a reference to digital files such as photos, videos, or audio (e.g., digital content 404a). Because NFTs are uniquely identifiable assets, they differ from cryptocurrencies, which are fungible. In particular, NFTs function like cryptographic tokens, but unlike cryptocurrencies such as Bitcoin or Ethereum™, NFTs are not mutually interchangeable, and so are not fungible.

The NFT can be associated with a particular digital or physical asset such as images, art, music, and sport highlights and can confer licensing rights to use the asset for a specified purpose. As with other assets, NFTs are recorded on a blockchain when a blockchain 304 concatenates records containing cryptographic hashes—sets of characters that identify a set of data-onto previous records, creating a chain of identifiable data blocks such as block 304a, block 304b, block 304c, and block 304d. A cryptographic transaction process enables authentication of each digital file by providing a digital signature that tracks NFT ownership. In embodiments, a data link that is part of the NFT records points to details about where the associated art is stored.

Minting an NFT can refer to the process of turning a digital file (e.g., digital content 404a) into a crypto collectible or digital asset on blockchain 304 (e.g., the Ethereum™ blockchain). The digital item or file (e.g., digital content 404a) can be stored in the blockchain 304 and cannot be able to be edited, modified, or deleted. The process of uploading a specific item onto the blockchain 304 is known as "minting." For example, "NFT minting" can refer to a process by which a digital art or digital content 404a becomes a part of the Ethereum™ blockchain. Thus, the process turns digital content 404a into a crypto asset, which is easily traded or bought with cryptocurrencies on a digital marketplace without an intermediary.

Figure 4B:
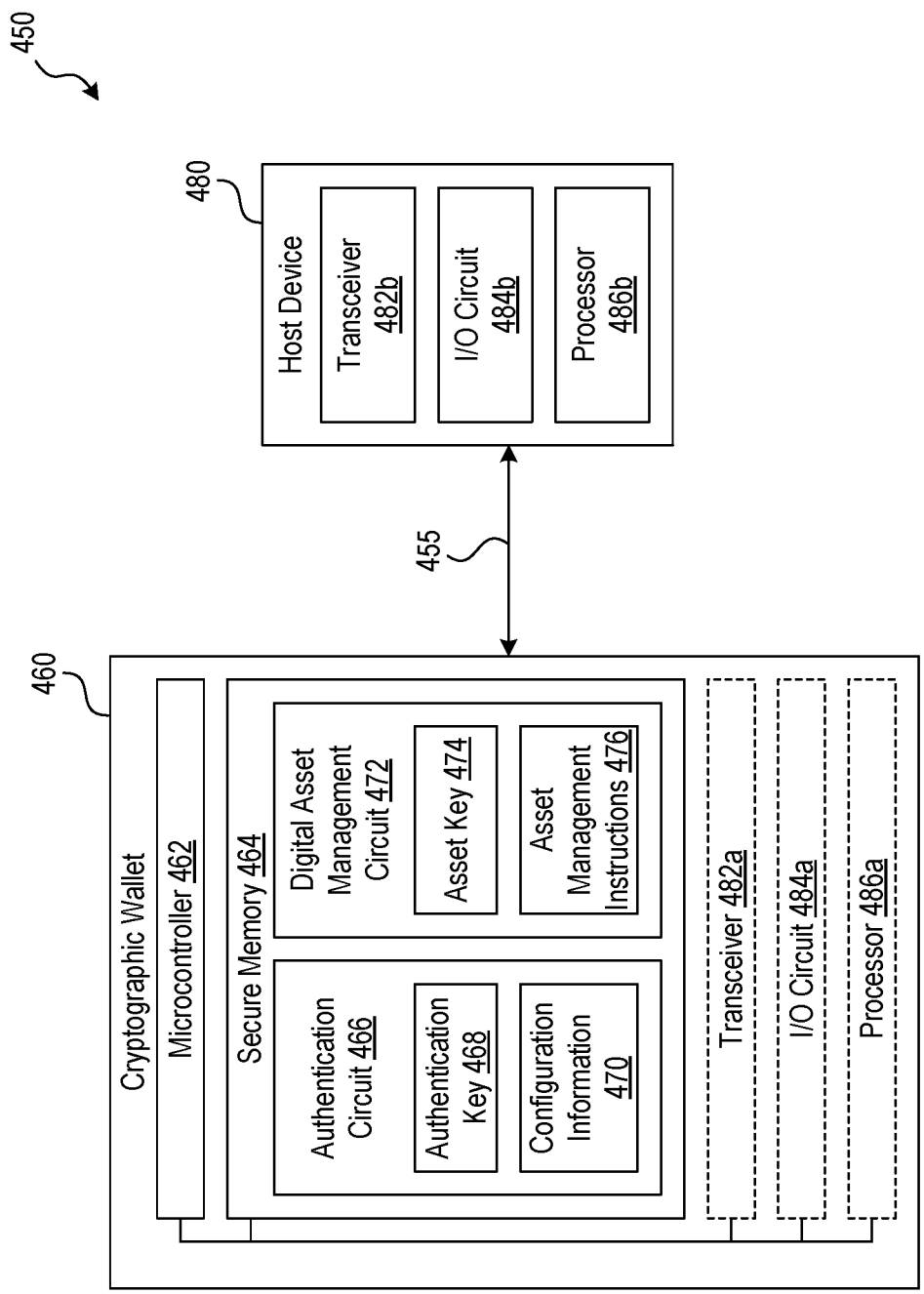
FIG. 4B is a block diagram illustrating an example cryptographic wallet, in accordance with one or more embodiments of this disclosure.

FIG. 4B is a block diagram 450 illustrating an example cryptographic wallet 460. As a general overview, cryptographic wallet 460 is an electronic entity that allows users to securely manage digital assets. According to various embodiments, the cryptographic wallet 460 can be a hardware-based wallet (e.g., can include dedicated hardware component(s)), a software-based wallet, or a combination thereof. Example digital assets that can be stored and managed using the cryptographic wallet 460 include digital coins, digital tokens, and/or the like. In some embodiments, tokens are stored on a blockchain system, such as the blockchain system 300 described in FIG. 3. In some embodiments, the cryptographic wallet 460 may be capable of connecting to and managing assets that are native to or associated with multiple, different blockchain systems (e.g., including multiple blockchain systems having structure similar to or equivalent to blockchain system 300).

As defined herein, the terms "coin" and "token" refer to a digital representation of a particular asset, utility, ownership interest, and/or access right. Any suitable type of coin or token can be managed using various embodiments of the cryptographic wallet 460. In some embodiments, tokens include cryptocurrency, such as exchange tokens and/or stablecoins. Exchange tokens and/or stablecoins can be native to a particular blockchain system and, in some instances, can be backed by a value-stable asset, such as fiat currency, precious metal, oil, or another commodity. In some embodiments, tokens are utility tokens that provide access to a product or service rendered by an operator of the blockchain system 300 (e.g., a token issuer). In some embodiments, tokens are security tokens, which can be securitized cryptocurrencies that derive from a particular asset, such as bonds, stocks, real estate, and/or fiat currency, or a combination thereof, and can represent an ownership right in an asset or in a combination of assets.

In some embodiments, tokens are NFTs or other non-fungible digital certificates of ownership. In some embodiments, tokens are decentralized finance (DeFi) tokens. DeFi tokens can be used to access feature sets of DeFi software applications (dApps) built on the blockchain system 300. Example dApps can include decentralized lending applications (e.g., Aave), decentralized cryptocurrency exchanges (e.g., Uniswap), decentralized NFT marketplaces (e.g., OpenSea, Rarible), decentralized gaming platforms (e.g., Upland), decentralized social media platforms (e.g., Steemit), decentralized music streaming platforms (e.g., Audius), and/or the like. In some embodiments, tokens provide access rights to various computing systems and can include authorization keys, authentication keys, passwords, PINs, biometric information, access keys, and other similar information. The computing systems to which the tokens provide access can be both on-chain (e.g., implemented as dApps on a particular blockchain system) or off-chain (e.g., implemented as computer software on computing devices that are separate from the blockchain system 300).

As shown, the cryptographic wallet 460 of FIG. 4B is communicatively coupled to the host device 480 (e.g., a mobile phone, a laptop, a tablet, a desktop computer, a wearable device, a point-of-sale (POS) terminal, an automated teller machine (ATM) and the like) via the communications link 455. In some embodiments, the host device 480 can extend the feature set available to the user of the cryptographic wallet 460 when it is coupled to the host device 480. For instance, the host device may provide the user with the ability to perform balance inquiries, convert tokens, access exchanges and/or marketplaces, perform transactions, access computing systems, and/or the like.

In some embodiments, the cryptographic wallet 460 and the host device 480 can be owned and/or operated by the same entity, user, or a group of users. For example, an individual owner of the cryptographic wallet 460 may also operate a personal computing device that acts as a host device 480 and provides enhanced user experience relative to the cryptographic wallet 460 (e.g., by providing a user interface that includes graphical features, immersive reality experience, virtual reality experience, or similar). In some embodiments, the cryptographic wallet 460 and the host device 480 can be owned and/or operated by different entities, users and/or groups of users. For example, the host device 480 can be a point-of-sale (POS) terminal at a merchant location, and the individual owner of the cryptographic wallet 460 may use the cryptographic wallet 460 as a method of payment for goods or services at the merchant location by communicatively coupling the two devices for a short period of time (e.g., via chip, via near-field communications (NFC), by scanning of a bar code, by causing the cryptographic wallet 460 to generate and display a quick response (QR) code, and/or the like) to transmit payment information from the cryptographic wallet 460 to the host device 480.

The cryptographic wallet 460 and the host device 480 can be physically separate and/or capable of being removably coupled. The ability to physically and communicatively uncouple the cryptographic wallet 460 from the host device 480 and other devices enables the air-gapped cryptographic wallet (e.g., cryptographic wallet 460) to act as "cold" storage, where the stored digital assets are moved offline and become inaccessible to the host device 480 and other devices. Further, the ability to physically and communicatively uncouple the cryptographic wallet 460 from the host device 480 allows the cryptographic wallet 460 to be implemented as a larger block of physical memory, which extends the storage capacity of the cryptographic wallet 460, similar to a safety deposit box or vault at a brick-and-mortar facility.

Accordingly, in some embodiments, the cryptographic wallet 460 and the host device 480 are physically separate entities. In such embodiments, the communications link 455 can include a computer network. For instance, the cryptographic wallet 460 and the host device 480 can be paired wirelessly via a short-range communications protocol (e.g., Bluetooth, ZigBee, infrared communication) or via another suitable network infrastructure. In some embodiments, the cryptographic wallet 460 and the host device 480 are removably coupled. For instance, the host device 480 can include a physical port, outlet, opening, or similar to receive and communicatively couple to the cryptographic wallet 460, directly or via a connector.

In some embodiments, the cryptographic wallet 460 includes tangible storage media, such as a dynamic random-access memory (DRAM) stick, a memory card, a secure digital (SD) card, a flash drive, a solid state drive (SSD), a magnetic hard disk drive (HDD), or an optical disc, and/or the like and can connect to the host device via a suitable interface, such as a memory card reader, a USB port, a micro-USB port, an eSATA port, and/or the like.

In some embodiments, the cryptographic wallet 460 can include an integrated circuit, such as a SIM card, a smart cart, and/or the like. For instance, in some embodiments, the cryptographic wallet 460 can be a physical smart card that includes an integrated circuit, such as a chip that can store data. In some embodiments, the cryptographic wallet 460 is a contactless physical smart card. Advantageously, such embodiments enable data from the card to be read by a host device as a series of application protocol data units (APDUs) according to a conventional data transfer protocol between payment cards and readers (e.g., ISO/IEC 7816), which enhances interoperability between the cryptographic payment ecosystem and payment card terminals.

In some embodiments, the cryptographic wallet 460 and the host device 480 are non-removably coupled. For instance, various components of the cryptographic wallet 460 can be co-located with components of the host device 480 in the housing of the host device 480. In such embodiments, the host device 480 can be a mobile device, such as a phone, a wearable, or similar, and the cryptographic wallet 460 can be built into the host device. The integration between the cryptographic wallet 460 and the host device 480 can enable improved user experience and extend the feature set of the cryptographic wallet 460 while preserving computing resources (e.g., by sharing the computing resources, such as transceiver, processor, and/or display or the host device 480). The integration further enables the case of asset transfer between parties. The integration can further enhance loss protection options, as recovering a password or similar authentication information, rather than recovering a physical device, can be sufficient to restore access to digital assets stored in the cryptographic wallet 460. In some embodiments, the non-removably coupled cryptographic wallet can be air-gapped by, for example, disconnecting the host device 480 from the Internet.

As shown, the cryptographic wallet 460 can include a microcontroller 462. The microcontroller 462 can include or be communicatively coupled to (e.g., via a bus or similar communication pathway) at least a secure memory 464. The cryptographic wallet 460 can further include a transceiver 482a, and input/output circuit 484a, and/or a processor 486a. In some embodiments, however, some or all of these components can be omitted.

In some embodiments, the cryptographic wallet 460 can include a transceiver 482a and therefore can be capable of independently connecting to a network and exchanging electronic messages with other computing devices. In some embodiments, the cryptographic wallet 460 does not include a transceiver 482a. The cryptographic wallet 460 can be capable of connecting to or accessible from a network, via the transceiver 482b of the host device 480, when the cryptographic wallet 460 is docked to the host device 480. For example, in some embodiments, the user of the cryptographic wallet 460 can participate in token exchange activities on decentralized exchanges when the cryptographic wallet 460 is connected to the host device 480.

In some embodiments, the cryptographic wallet 460 can include an input/output circuit 484a, which may include user-interactive controls, such as buttons, sliders, gesture-responsive controls, and/or the like. The user-interactive controls can allow a user of the cryptographic wallet 460 to interact with the cryptographic wallet 460 (e.g., perform balance inquiries, convert tokens, access exchanges and/or marketplaces, perform transactions, access computing systems, and/or the like). In some embodiments, the user can access an expanded feature set, via the input/output circuit 484b of the host device 480, when the cryptographic wallet 460 is docked to the host device 480. For example, host device 480 can include computer-executable code structured to securely access data from the secure memory 464 of the cryptographic wallet 460 and to perform operations using the data. The data can include authentication information, configuration information, asset keys, and/or token management instructions. The data can be used by an application that executes on or by the host device 480. The data can be used to construct application programming interface (API) calls to other applications that require or use the data provided by cryptographic wallet 460. Other applications can include any on-chain or off-chain computer applications, such as dApps (e.g., decentralized lending applications, decentralized cryptocurrency exchanges, decentralized NFT marketplaces, decentralized gaming platforms, decentralized social media platforms, decentralized music streaming platforms), third-party computing systems (e.g., financial institution computing systems, social networking sites, gaming systems, online marketplaces), and/or the like.

The secure memory 464 is shown to include an authentication circuit 466 and a digital asset management circuit 472. The authentication circuit 466 and/or digital asset management circuit 472 include computer-executable code that, when executed by one or more processors, such as one or more processors of processor 486a and/or processor 486b, performs specialized computer-executable operations. For example, the authentication circuit 466 can be structured to cause the cryptographic wallet 460 to establish, maintain and manage a secure electronic connection with another computing device, such as the host device 480. The digital asset management circuit 472 can be structured to cause the cryptographic wallet 460 to allow a user to manage the digital assets accessible via the cryptographic wallet 460. In some embodiments, the authentication circuit 466 and the digital asset management circuit 472 are combined in whole or in part.

As shown, the authentication circuit 466 can include retrievably stored security, authentication, and/or authorization data, such as the authentication key 468. The authentication key 468 can be a numerical, alphabetic, or alphanumeric value or combination of values. The authentication key 468 can serve as a security token that enables access to one or more computing systems, such as the host device 480. For instance, in some embodiments, when the cryptographic wallet 460 is paired or docked to (e.g., establishes an electronic connection with) the host device 480, the user may be prompted to enter authentication information via the input/output circuit(s) of input/output circuit 484a and/or input/output circuit 484b. The authentication information may include a PIN, a password, a pass phrase, biometric information (e.g., fingerprint, a set of facial features, a retinal scan), a voice command, and/or the like. The authentication circuit 466 can compare the user-entered information to the authentication key 468 and maintain the electronic connection if the items match at least in part.

As shown, the authentication circuit 466 can include retrievably stored configuration information such as configuration information 470. The configuration information 470 can include a numerical, alphabetic, or alphanumeric value or combination of values. These items can be used to enable enhanced authentication protocols. For instance, the configuration information 470 can include a timeout value for an authorized connection between the cryptographic wallet 460 and the host device 480. The configuration information 470 can also include computer-executable code. In some embodiments, for example, where a particular cryptographic wallet, such as cryptographic wallet 460, is set up to pair with only one or a small number of pre-authorized host devices such as host device 480, the configuration information 470 can include a device identifier and/or other device authentication information, and the computer-executable code may be structured to verify the device identifier and/or other device authentication information against the information associated with or provided by the host device 480. When a pairing is attempted, the computer-executable code may initiate or cause the host device 480 to initiate an electronic communication (e.g., an email message, a text message, etc.) using user contact information stored as configuration information 470.

As shown, the digital asset management circuit 472 can include retrievably stored digital asset data, such as the asset key 474. The asset key 474 can be a numerical, alphabetic, or alphanumeric value or combination of values. In some embodiments, the asset key 474 is a private key in a public/private key pair, a portion thereof, or an item from which the private key can be derived. Accordingly, the asset key 474 proves ownership of a particular digital asset stored on a blockchain system 300. The asset key 474 can allow a user to perform blockchain transactions involving the digital asset. The blockchain transactions can include computer-based operations to earn, lend, borrow, long/short, earn interest, save, buy insurance, invest in securities, invest in stocks, invest in funds, send and receive monetary value, trade value on decentralized exchanges, invest and buy assets, sell assets, and/or the like. The cryptographic wallet 460 can be identified as a party to a blockchain transaction on the blockchain system 300 using a unique cryptographically generated address (e.g., the public key in the public/private key pair).

As shown, the digital asset management circuit 472 can also include retrievably stored asset management instructions such as asset management instructions 476. The asset management instructions 476 can include a numerical, alphabetic, or alphanumeric value or combination of values. These items can be used to enable computer-based operations related to managing digital assets identified by the asset key 474. For instance, the asset management instructions 476 can include parameter values, metadata, and/or similar values associated with various tokens identified by the asset key 474 and/or by the blockchain system 300 associated with particular tokens. The asset management instructions 476 can also include computer-executable code. In some embodiments, for example, asset management functionality (e.g., balance inquiry and the like) can be executable directly from the cryptographic wallet 460 rather than or in addition to being executable from the host device 480.

Figure 5:
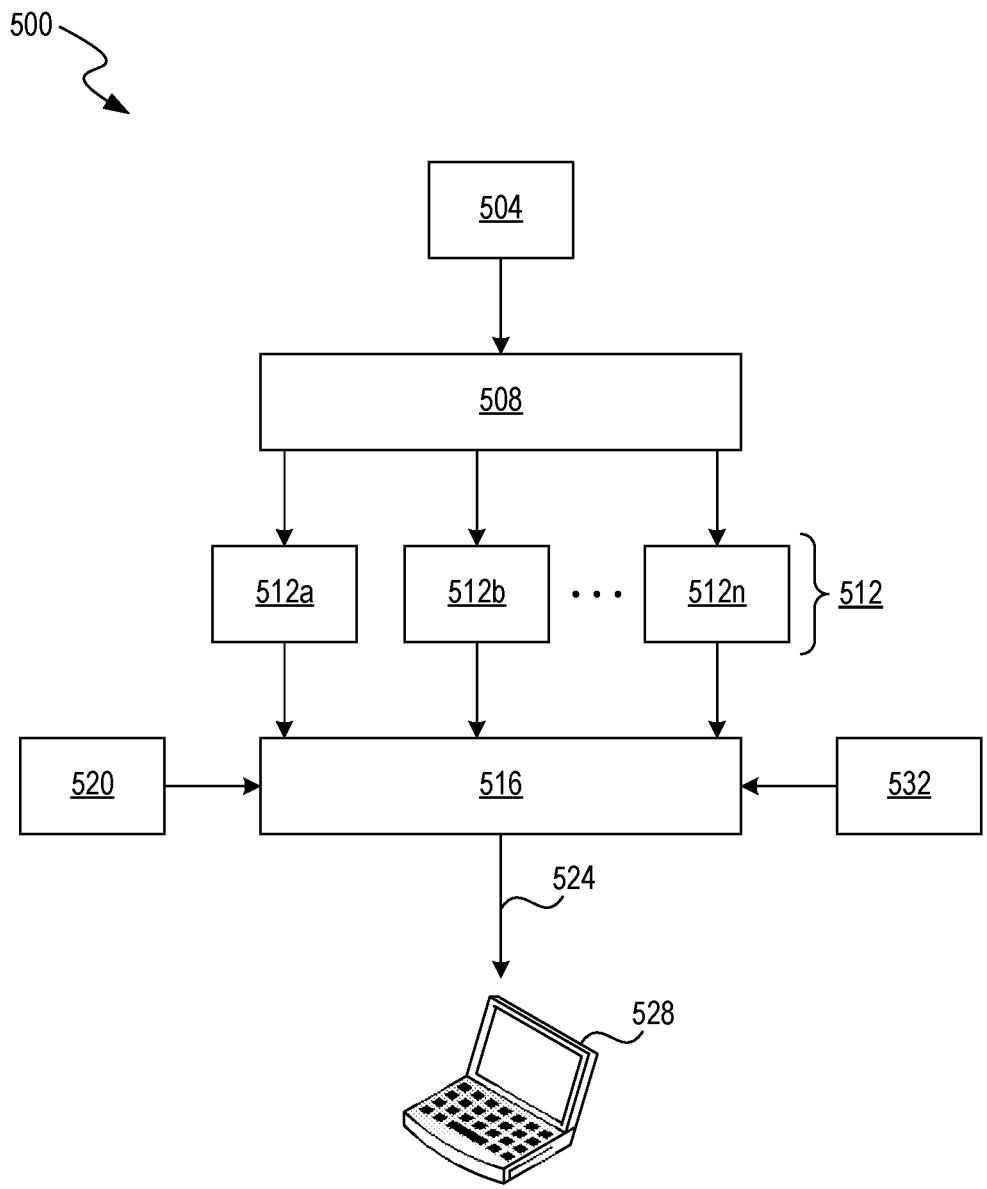
FIG. 5 is a block diagram illustrating an example machine learning (ML) system, in accordance with one or more embodiments of this disclosure.

FIG. 5 is a block diagram illustrating an example machine learning (ML) system 500. The ML system 500 is implemented using components of the example computer system 600 illustrated and described in more detail with reference to FIG. 6. For example, the ML system 500 can be implemented on the computer system 600 using instructions 608 programmed in the main memory 606 illustrated and described in more detail with reference to FIG. 4A. Likewise, embodiments of the ML system 500 can include different and/or additional components or be connected in different ways. The ML system 500 is sometimes referred to as a ML module.

The ML system 500 includes a feature extraction module 508 implemented using components of the example computer system 600 illustrated and described in more detail with reference to FIG. 4A. In some embodiments, the feature extraction module 508 extracts a feature vector 512 from input data 504. The feature vector 512 includes features 512a, 512b, . . . , 512n. The feature extraction module 508 reduces the redundancy in the input data 04, e.g., repetitive data values, to transform the input data 504 into the reduced set of features such as feature vector 512, e.g., features 512a, 512b, . . . , 512n. The feature vector 512 contains the relevant information from the input data 504, such that events or data value thresholds of interest can be identified by the ML model 516 by using this reduced representation. In some example embodiments, the following dimensionality reduction techniques are used by the feature extraction module 508: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some embodiments, the ML model 516 performs deep learning (also known as deep structured learning or hierarchical learning) directly on the input data 504 to learn data representations, as opposed to using task-specific algorithms. In deep learning, no explicit feature extraction is performed; the features of feature vector 512 are implicitly extracted by the ML system 500. For example, the ML model 516 can use a cascade of multiple layers of nonlinear processing units for implicit feature extraction and transformation. Each successive layer uses the output from the previous layer as input. The ML model 516 can thus learn in supervised (e.g., classification) and/or unsupervised (e.g., pattern analysis) modes. The ML model 516 can learn multiple levels of representations that correspond to different levels of abstraction, wherein the different levels form a hierarchy of concepts. In this manner, the ML model 516 can be configured to differentiate features of interest from background features.

In one example, the ML model 516, e.g., in the form of a CNN generates the output 524, without the need for feature extraction, directly from the input data 504. In some examples, the output 524 is provided to the computer device 528 or video display 618. The computer device 528 is a server, computer, tablet, smartphone, smart speaker, etc., implemented using components of the example computer system 600 illustrated and described in more detail with reference to FIG. 4A. In some embodiments, the steps performed by the ML system 500 are stored in memory on the computer device 528 for execution.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 516 can be a CNN that includes both convolutional layers and max pooling layers. The architecture of the ML model 516 can be "fully convolutional," which means that variable sized sensor data vectors can be fed into it. For all convolutional layers, the ML model 516 can specify a kernel size, a stride of the convolution, and an amount of zero padding applied to the input of that layer. For the pooling layers, the ML model 516 can specify the kernel size and stride of the pooling.

In some embodiments, the ML system 500 trains the ML model 516, based on the training data 520, to correlate the feature vector 512 to expected outputs in the training data 520. As part of the training of the ML model 516, the ML system 500 forms a training set of features and training labels by identifying a positive training set of features that have been determined to have a desired property in question, and, in some embodiments, forms a negative training set of features that lack the property in question.

The ML system 500 applies ML techniques to train the ML model 516, that when applied to the feature vector 512, outputs indications of whether the feature vector 512 has an associated desired property or properties, such as a probability that the feature vector 512 has a particular Boolean property, or an estimated value of a scalar property. The ML system 500 can further apply dimensionality reduction (e.g., via linear discriminant analysis (LDA), PCA, or the like) to reduce the amount of data in the feature vector 512 to a smaller, more representative set of data.

The ML system 500 can use supervised ML to train the ML model 516, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 532 is formed of additional features, other than those in the training data 520, which have already been determined to have or to lack the property in question. The ML system 500 applies the trained ML model (e.g., ML model 516) to the features of the validation set 532 to quantify the accuracy of the ML model 516. Common metrics applied in accuracy measurement include: Precision and Recall, where Precision refers to a number of results the ML model 516 correctly predicted out of the total it predicted, and Recall is a number of results the ML model 516 correctly predicted out of the total number of features that had the desired property in question. In some embodiments, the ML system 500 iteratively re-trains the ML model 516 until the occurrence of a stopping condition, such as the accuracy measurement indication that the ML model 516 is sufficiently accurate, or a number of training rounds having taken place. The validation set 532 can include data corresponding to confirmed anatomical features, tissue states, tissue conditions, diagnoses, or combinations thereof. This allows the detected values to be validated using the validation set 532. The validation set 532 can be generated based on analysis to be performed.

Figure 6:
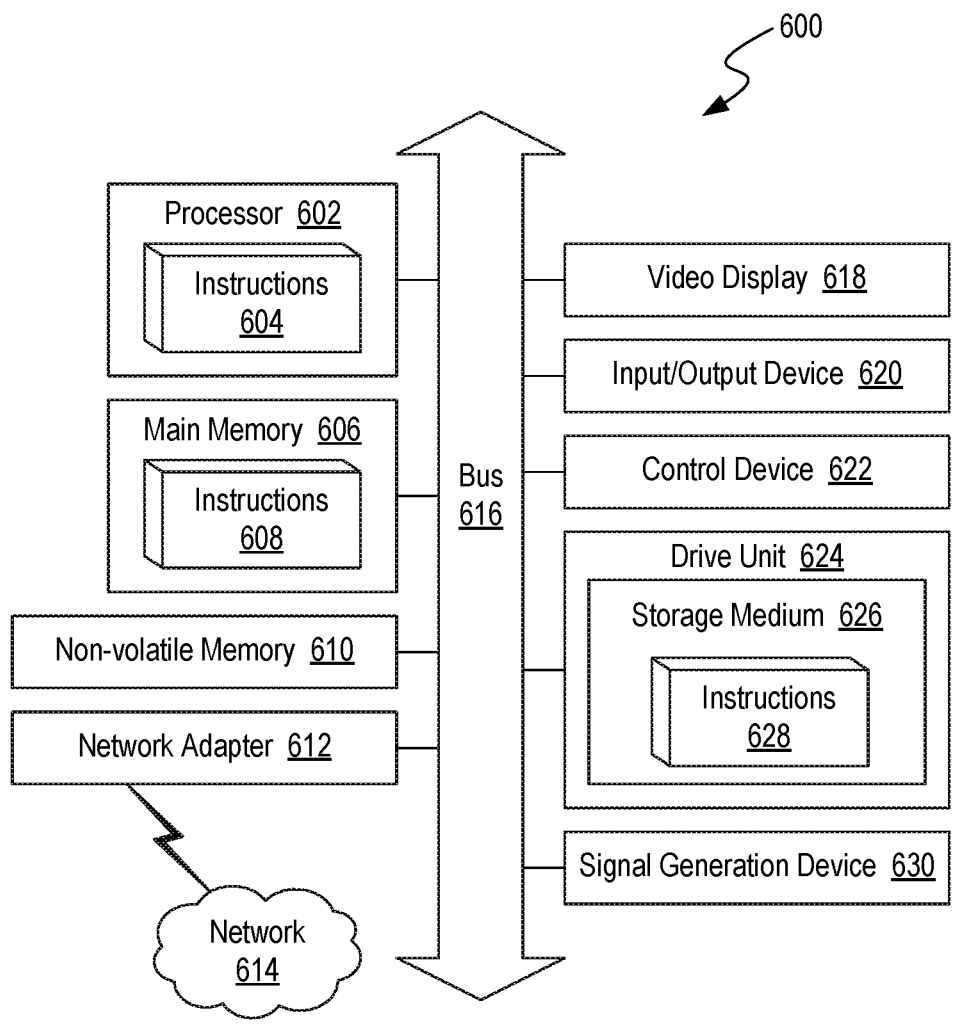
FIG. 6 is a block diagram illustrating an example computer system, in accordance with one or more embodiments of this disclosure.

FIG. 6 is a block diagram illustrating an example computer system 600, in accordance with one or more embodiments. In some embodiments, components of the example computer system 600 are used to implement the blockchain system 300 or the ML system 500 illustrated and described in more detail with reference to FIGS. 3 and 5. At least some operations described herein can be implemented on the computer system 600.

The computer system 600 can include one or more central processing units ("processors") such as one or more processors 602, and can further include main memory 606, non-volatile memory 610, network adapter 612 (e.g., network interface), video displays 618, input/output devices 620, control devices 622 (e.g., keyboard and pointing devices), drive units 624 including a storage medium 626, and a signal generation device 630 that are communicatively connected to a bus 616. The bus 616 is illustrated as an abstraction that represents one or more physical buses and/or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 600 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the computer system 600.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 604, 608, 628) set at various times in various memory and storage devices in a computer device. When read and executed by the one or more processors 602, the instruction(s) cause the computer system 600 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and/or non-volatile memory 610, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 612 enables the computer system 600 to mediate data in a network 614 with an entity that is external to the computer system 600 through any communication protocol supported by the computer system 600 and the external entity. The network adapter 612 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 612 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

What is claimed is:

1. A computer-implemented cryptographic method for validating non-fungible tokens (NFTs), the method comprising:

obtaining, using an imaging sensor of an electronic device, one or more analog values for generating a digital image;

generating, using the one or more analog values, a first hash value and the digital image;

storing the one or more analog values using a cryptography-based storage application associated with the electronic device, wherein the one or more analog values are configured to be stored to be accessible only from the electronic device storing a private cryptographic key of the cryptography-based storage application by:

determining, whether or not the electronic device is enabled to access the one or more analog values;

responsive to determining that the electronic device is not enabled to access the one or more analog values, preventing access to the one or more analog values;

generating a blockchain operation request to be executed by a blockchain node for minting a single first NFT using the digital image and the first hash value;
transmitting the blockchain operation request to the blockchain node to commit the single first NFT to a blockchain using an on-chain program,
    wherein the single first NFT incorporates the first hash value as a first hash identification code, and
    wherein the single first NFT is assigned to the cryptography-based storage application;
generating a second blockchain operation request to be executed by a blockchain node for inserting an encrypted URI for accessing the one or more analog values into metadata of the single first NFT including (1) the first hash identification code and (2) encrypted URI, wherein the encrypted URI is generated by encrypting a resource identifier using a public key associated with the cryptography-based storage application;
transmitting the second blockchain operation request to the blockchain node for inserting the encrypted URI;
receiving, from a computer device, a validation request referencing a second NFT minted using the digital image, the second NFT incorporating a second hash identification code;
responsive to receiving the validation request, retrieving the one or more analog values using the cryptography-based storage application, wherein retrieving the one or more analog values comprises:
    decrypting an encrypted URI obtained from metadata of the single first NFT using the private cryptographic key associated with the cryptography-based storage application to obtain a URI;
    transmitting, to a remote server, a request to access the one or more analog values at a location indicated by the obtained URI; and
    obtaining, via a transmission from the remote server, the one or more analog values;
generating a second hash value using the one or more analog values;
comparing the second hash value to the second hash identification code; and
responsive to determining that the second hash value matches the second hash identification code, transmitting a message to the computer device indicating validity of the second NFT.

2. The method of claim 1, wherein the blockchain operation request is a first blockchain operation request, and wherein storing the one or more analog values comprises:
    encrypting a uniform resource identifier (URI) using a public key associated with the cryptography-based storage application; and
    generating a second blockchain operation request for inserting the encrypted URI into metadata of the single first NFT.

3. The method of claim 1, wherein retrieving the one or more analog values comprises:
    decrypting an encrypted URI obtained from metadata of the single first NFT using the private cryptographic key associated with the cryptography-based storage application to obtain a URI; and
    providing, using the URI, the one or more analog values.

4. The method of claim 1, wherein the cryptography-based storage application is a first cryptography-based storage application,
    wherein the first cryptography-based storage application is associated with a first user, and
    wherein the blockchain operation request is a first blockchain operation request, the method comprising:
    receiving, from a second cryptography-based storage application associated with a second user, a transfer request for transferring control of the single first NFT from the first user to the second user;
    decrypting an encrypted first URI obtained from metadata of the single first NFT using the private cryptographic key associated with the first cryptography-based storage application to obtain a first URI;
    encrypting the first URI using a public key associated with the second cryptography-based storage application to obtain an encrypted second URI; and
    transmitting a second blockchain operation request for updating metadata of the single first NFT with the encrypted second URI for transferring control of the single first NFT to the second user.

5. The method of claim 4, comprising:
    obtaining an indication that a second blockchain operation of the second blockchain operation request is completed; and
    in response to obtaining the indication, transmitting a notification to the computer device, wherein the computer device is associated with the second cryptography-based storage application.

6. The method of claim 1, wherein storing the one or more analog values comprises:
    sending, using the cryptography-based storage application, a digital representation of the one or more analog values to a cryptographic wallet.

7. The method of claim 1, wherein the cryptography-based storage application comprises a software digital wallet configured to store the single first NFT.

8. The method of claim 1, wherein the cryptography-based storage application is associated with a hardware digital wallet configured to store the single first NFT.

9. The method of claim 1, wherein the single first NFT is the second NFT.

10. The method of claim 1, wherein the digital image is generated by interpolating the one or more analog values.

11. A non-transitory, computer-readable medium storing instructions that, when executed by one or more processors, cause the one or more processors to:
    obtain, using an imaging sensor of an electronic device, one or more analog values for generating a digital image;
    generate, using the one or more analog values, a first hash value and the digital image;
    storing the one or more analog values using a cryptography-based storage application associated with the electronic device, wherein the one or more analog values are configured to be stored to be accessible only from the electronic device storing a private cryptographic key of the cryptography-based storage application;
    determine, whether or not the electronic device is enabled to access the one or more analog values;
    responsive to determining that the electronic device is not enabled to access the one or more analog values, prevent access to the one or more analog values;
    transmit a blockchain operation request to a blockchain to mint a single first NFT using an on-chain program, wherein the single first NFT incorporates the first hash value as a first hash identification code; receive, from a computer device, a validation request referencing a second NFT minted using the digital image, the second NFT incorporating a second hash identification code;

generate a second blockchain operation request to be executed by a blockchain node for inserting an encrypted URI for accessing the one or more analog values into metadata of the single first NFT including (1) the first hash identification code and (2) encrypted URI, wherein the encrypted URI is generated by encrypting a resource identifier using a public key associated with the cryptography-based storage application;

transmit the second blockchain operation request to the blockchain node for inserting the encrypted URI;

responsive to receiving the validation request, retrieving the one or more analog values using the cryptography-based storage application, wherein retrieving the one or more analog values comprises:

decrypting an encrypted URI obtained from metadata of the single first NFT using the private cryptographic key associated with the cryptography-based storage application to obtain a URI;

transmitting, to a remote server, a request to access the one or more analog values at a location indicated by the obtained URI; and obtaining, via a transmission from the remote server, the one or more analog values;

generating a second hash value using the one or more analog values; and responsive to determining that the second hash value matches the second hash identification code, transmit a message indicating validity of the second NFT to the computer device.

12. The computer-readable medium of claim 11, wherein generating the first hash value comprises applying a hash function to the one or more analog values.

13. The computer-readable medium of claim 11, wherein the instructions cause the one or more processors to:

store the one or more analog values using a cryptography-based storage application associated with the electronic device; and responsive to receiving the validation request, retrieve the one or more analog values using the cryptography-based storage application.

14. The computer-readable medium of claim 13, wherein the instructions to retrieve the one or more analog values cause the one or more processors to:

decrypt an encrypted URI obtained from metadata of the single first NFT using the private cryptographic key associated with the cryptography-based storage application to obtain a URI; and provide, using the URI, the one or more analog values.

15. The computer-readable medium of claim 13, wherein the cryptography-based storage application is a first cryptography-based storage application, wherein the first cryptography-based storage application is associated with a first user, wherein the blockchain operation request is a first blockchain operation request, and wherein the instructions cause the one or more processors to:

receive, from a second cryptography-based storage application associated with a second user, a transfer request for transferring control of the single first NFT from the first user to the second user;

decrypt an encrypted first URI obtained from metadata of the single first NFT using the private cryptographic key associated with the first cryptography-based storage application to obtain a first URI;

encrypt the first URI using a public key associated with the second cryptography-based storage application to obtain an encrypted second URI; and transmit a second blockchain operation request for updating the metadata of the single first NFT with the encrypted second URI for transferring control of the single first NFT to the second user.

16. The computer-readable medium of claim 13, wherein the instructions to store the one or more analog values cause the one or more processors to:

send, using the cryptography-based storage application, a digital representation of the one or more analog values to a cryptographic wallet.

17. A device for validating a non-fungible token (NFT), the device comprising:

an imaging sensor;

one or more processors; and a non-transitory, computer-readable storage medium storing instructions that, when executed by the one or more processors, cause the one or more processors to:

obtain, using the imaging sensor, one or more analog values for generating a digital image;

generate, using the one or more analog values, a first hash value and the digital image;

store the one or more analog values using a cryptography-based storage application, the one or more analog values stored for validating a second NFT minted using the digital image, wherein the one or more analog values are configured to be stored to be accessible only from a device storing a private cryptographic key of the cryptography-based storage application;

determine, whether or not the device is enabled to access the one or more analog values;

responsive to determining that the device is not enabled to access the one or more analog values, prevent access to the one or more analog values;

generate a blockchain operation request to be executed by a blockchain node for minting a single first NFT using the digital image and the first hash value;

transmit the blockchain operation request to the blockchain node to commit the single first NFT to a blockchain using an on-chain program;

generate a second blockchain operation request to be executed by a blockchain node for inserting an encrypted URI for accessing the one or more analog values into metadata of the single first NFT including (1) the first hash value and (2) encrypted URI, wherein the encrypted URI is generated by encrypting a resource identifier using a public key associated with the cryptography-based storage application;

transmit the second blockchain operation request to the blockchain node for inserting the encrypted URI;

receive, from a computer device, a validation request referencing a second NFT minted using the digital image, the second NFT incorporating a second hash identification code; and responsive to receiving the validation request, retrieving the one or more analog values using the cryptography-based storage application, wherein retrieving the one or more analog values comprises:

decrypting an encrypted URI obtained from metadata of the single first NFT using the private cryptographic key associated with the cryptography-based storage application to obtain a URI;

transmitting, to a remote server, a request to access the one or more analog values at a location indicated by the obtained URI; and obtaining, via a transmission from the remote server, the one or more analog values.

18. The device of claim 17, wherein the single first NFT incorporates the first hash value as a first hash identification code, and wherein the instructions cause the one or more processors to:

receive, from a computer device, a validation request referencing the second NFT, the second NFT incorporating a second hash identification code;

generate a second hash value using the one or more analog values; and responsive to determining that the second hash value matches the second hash identification code, transmit a message indicating validity of the second NFT to the computer device.

19. The device of claim 17, wherein the blockchain operation request is a first blockchain operation request, and wherein the instructions to store the one or more analog values cause the one or more processors to:

encrypt a uniform resource identifier (URI) using a public key associated with the cryptography-based storage application; and generate a second blockchain operation request for inserting the encrypted URI into metadata of the single first NFT.

20. The device of claim 17, wherein the instructions cause the one or more processors to:

decrypt an encrypted URI obtained from metadata of the single first NFT using the private cryptographic key associated with the cryptography-based storage application to obtain a URI; and provide, using the URI, the one or more analog values.

* * * * *